(12) United States Patent
Tu et al.

(10) Patent No.: US 10,805,771 B1
(45) Date of Patent: Oct. 13, 2020

(54) LOCATION TRACKING DEVICE AND METHOD

(71) Applicant: Goldtek Technology Co., Ltd., New Taipei (TW)

(72) Inventors: Tung-Sheng Tu, New Taipei (TW); Fu-Yuan Tsai, New Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 0 days.

(21) Appl. No.: 16/545,251

(22) Filed: Aug. 20, 2019

(30) Foreign Application Priority Data

Jun. 25, 2019 (TW) .................................. 108122222

(51) Int. Cl.
   *H04W 4/029* (2018.01)
   *G01S 19/25* (2010.01)
   *G08B 21/02* (2006.01)
   *H04W 4/90* (2018.01)
   *G01S 19/35* (2010.01)

(52) U.S. Cl.
   CPC ............. *H04W 4/029* (2018.02); *G01S 19/25* (2013.01); *G01S 19/35* (2013.01); *G08B 21/02* (2013.01); *H04W 4/90* (2018.02)

(58) Field of Classification Search
   CPC ......... H04W 4/029; H04W 4/90; G01S 19/25; G01S 19/35; G08B 21/02
   USPC ........................ 455/456.3, 404.1, 404.2, 574
   See application file for complete search history.

(56) References Cited

U.S. PATENT DOCUMENTS

| | | | |
|---|---|---|---|
| 9,102,388 B2 * | 8/2015 | Lee | B63C 9/00 |
| 9,384,648 B2 * | 7/2016 | Yan | G01S 5/0231 |
| 2003/0210142 A1 * | 11/2003 | Freathy | G08B 21/22 |
| | | | 340/539.13 |
| 2004/0113836 A1 * | 6/2004 | Rickerson, Jr. | B63C 9/20 |
| | | | 342/357.54 |
| 2008/0062816 A1 * | 3/2008 | Leal | G01S 7/003 |
| | | | 367/93 |
| 2008/0174484 A1 * | 7/2008 | Katz | G01S 19/17 |
| | | | 342/357.31 |
| 2010/0069087 A1 * | 3/2010 | Chow | G08B 21/023 |
| | | | 455/456.1 |
| 2011/0063138 A1 * | 3/2011 | Berkobin | B60R 25/1004 |
| | | | 340/988 |

(Continued)

FOREIGN PATENT DOCUMENTS

| | | |
|---|---|---|
| CN | 204759686 | 11/2015 |
| CN | 105938200 | 9/2016 |

*Primary Examiner* — Mong-Thuy T Tran
(74) *Attorney, Agent, or Firm* — ScienBiziP, P.C.

(57) ABSTRACT

A method for sending location information continuously of a user in need of rescue and carrying a location tracking device of the disclosure includes determining whether a rescue-needed signal is received, and if so controlling a first positioning module of the location tracking device to send a first positioning signal. Determining whether a power level of the location tracking device is more or less than a predetermined power level and turning off the first positioning module if less. If so, the location tracking device sends a second positioning signal when the power level is less than the predetermined power level, the power consumption of the second positioning module being less than that of the first positioning module. Thereby, transmission of a rescue signal is enabled for an extended period and over a longer distance.

16 Claims, 4 Drawing Sheets

(56) References Cited

U.S. PATENT DOCUMENTS

| | | | |
|---|---|---|---|
| 2013/0059606 A1* | 3/2013 | Pujol | H04W 4/023 455/456.3 |
| 2013/0143519 A1* | 6/2013 | Doezema | G08B 21/0446 455/404.2 |
| 2013/0316726 A1* | 11/2013 | Laws | H04L 65/1063 455/456.1 |
| 2014/0106782 A1* | 4/2014 | Chitre | H04W 4/33 455/456.2 |
| 2014/0159951 A1* | 6/2014 | Gou | G01S 19/35 342/357.25 |
| 2016/0088564 A1* | 3/2016 | Ahmadzadeh | H04W 52/0254 455/405 |
| 2017/0229004 A1* | 8/2017 | Shah | F41H 9/10 |

\* cited by examiner

LOCATION TRACKING DEVICE AND METHOD

FIELD

The subject matter herein generally relates to air and sea rescue.

BACKGROUND

Life-saving devices, such as life jackets, can only passively wait for search and rescue when a person falls into water. Although the person can call for help by a mobile phone, the mobile phone may not be in range, and a power of the mobile phone is limited. Search and rescue may be difficult and inefficient, and an optimal time to rescue the person may be missed.

Thus, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
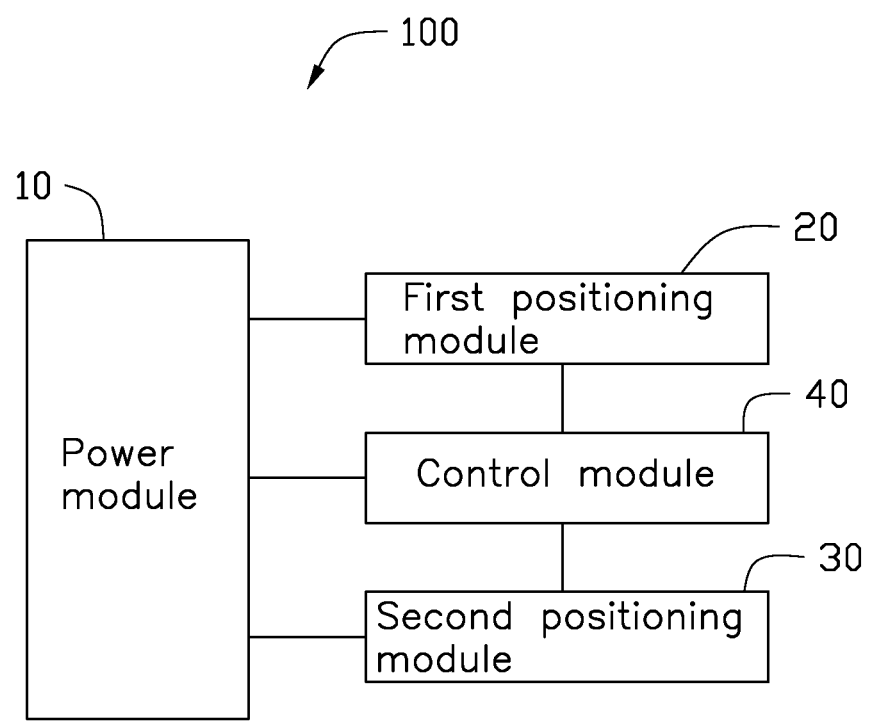
FIG. 1 is a block diagram of an embodiment of a location tracking device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a location tracking device 100 in accordance with an embodiment. The location tracking device 100 can comprise a power module 10, a first positioning module 20, a second positioning module 30, and a control module 40. The power module 10 is coupled to the first positioning module 20, the second positioning module 30, and the control module 40, and the power module 10 supplies power to the location tracking device 100.

The first positioning module 20 is configured to send a first positioning signal, the second positioning module 30 is configured to send a second positioning signal, and a power consumption of the first positioning module 20 is greater than a power consumption of the second positioning module 30.

In one embodiment, the first positioning module 20 can be a global position system (GPS) module, and the second positioning module 30 can be a long range (LORA) positioning module. The LORA positioning module is a positioning module based on LORA wireless communication technology, the LORA positioning module has advantages of low power consumption and low sensitivity to interference.

The control module 40 is coupled to the first positioning module 20 and the second positioning module 30. The control module 40 is configured to determine whether a rescue-needed signal is received. When the rescue-needed signal is received, the control module 40 controls the first positioning module 20 to send the first positioning signal to call for help.

In one embodiment, the rescue-needed signal can be triggered by a human user or a detection event that the location tracking device 100 is in a distress environment. For example, the distress environment may be immersion in water.

Figure 2:
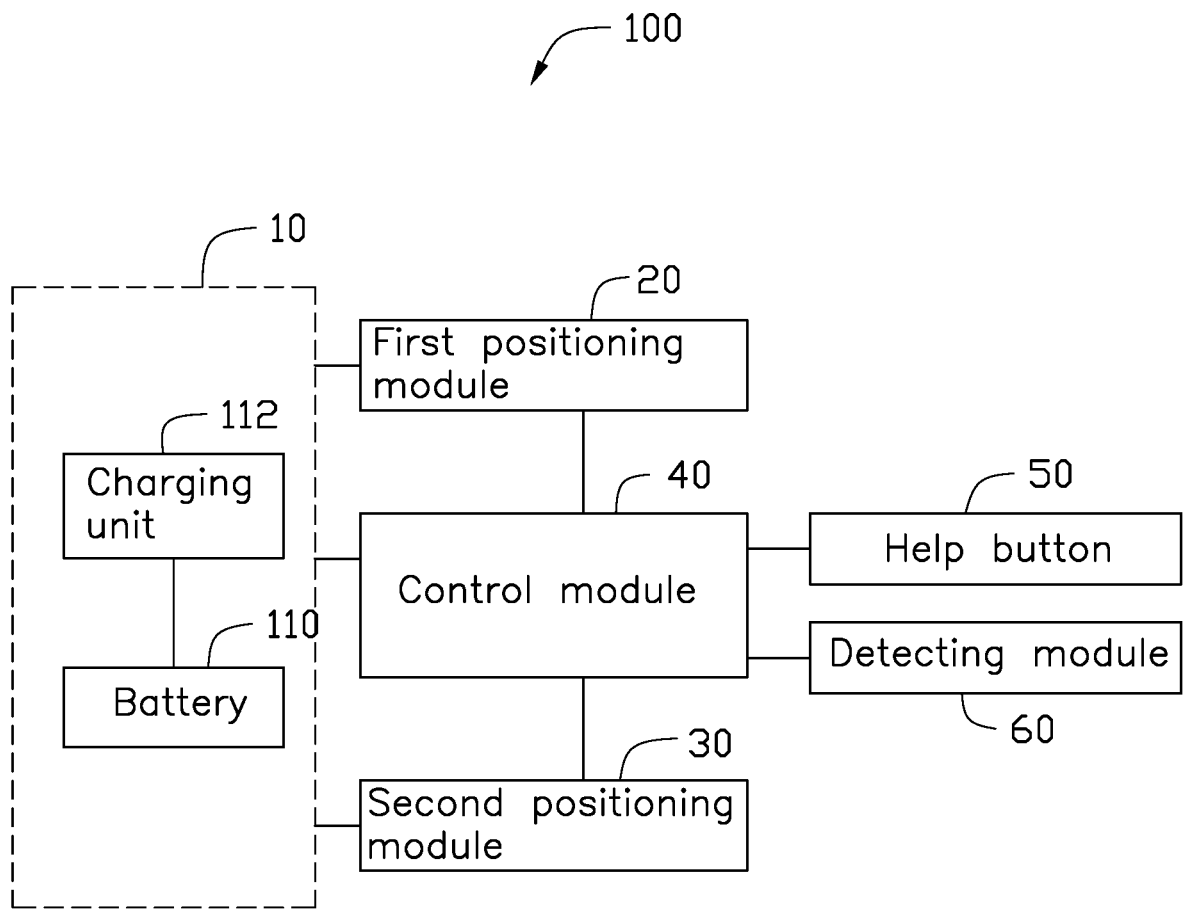
FIG. 2 is a block diagram of another embodiment of a location tracking device.

Referring to FIG. 2, the location tracking device 100 further comprises a help button 50 and a detecting module 60. The help button 50 and the detecting module 60 are coupled to the control module 40. When the help button 50 is pressed, the rescue-needed signal is generated, then the control module 40 can receive the rescue-needed signal to control the first positioning module 20 to send the first positioning signal.

The detecting module 60 is configured to detect and determine whether the current environment of the location tracking device 100 meets a predetermined condition. When the current environment of the location tracking device 100 meets the predetermined condition, the rescue-needed signal is generated by the detecting module 60. For example, the location tracking device 100 may be disposed in a life jacket, and when a life jacket with the positioning tracking device 100 is in water, the detecting module 60 can detect such event, and the detecting module 60 generates the rescue-needed signal. The detecting module 60 can comprise a water sensor to detect the immersion in water.

In one embodiment, the location tracking device 100 can either comprise the help button 50 or the detecting module 60.

In one embodiment, the detecting module 60 is configured to detect and determine whether physiological information of the current user of the location tracking device 100 meets a predetermined characteristic. When the physiological information of the current user of the location tracking device 100 meets the predetermined characteristic, the rescue-needed signal is generated by the detecting module 60. The physiological information can comprise a certain heartbeat, a certain body temperature, or a certain blood oxygen level. When the detecting module 60 detects and determines that the heartbeat, the body temperature, or the blood oxygen level of the current user of the location tracking device 100 is in an abnormal state, the detecting module 60 generates the rescue-needed signal.

In one embodiment, the detecting module 60 can comprise a millimeter wave sensor, a body temperature sensor, or a blood oxygen sensor. The detecting module 60 can be configured to detect the physiological information of the current user of the location tracking device 100, and the control module 40 can be configured to determine whether the physiological information of the current user meets the predetermined characteristic.

In one embodiment, the power module 10 can be charged by receiving solar energy to improve an endurance of the location tracking device 100. The power module 10 can comprise a battery 110 and a charging unit 112. The charging unit 112 can receive solar energy to generate a charging current to charge the battery 110.

In one embodiment, the effective range of the LORA positioning module is generally within 15-20 km, even at low power consumption. When rescuers are far away from a user, the rescuers cannot search for a rescue signal. The GPS module has a wide effective range, but consumes high power. In order to improve the success rate of rescue, the control module 40 is further configured to determine whether a power level of the power module 10 is less than a predetermined power level. When the power level of the power module 10 is less than the predetermined power level, the control module 40 controls the first positioning module 20 to enter a sleep mode, and controls the second positioning module 30 to send the second positioning signal.

In one embodiment, charging effectiveness of the power module 10 will fluctuate with the ambient light intensity. In order to improve the success rate of rescue, when the power of the power module 10 is less than the predetermined power level, the control module 40 controls the first positioning module 20 to enter the sleep mode and to stop sending the first positioning signal. The control module 40 controls only the second positioning module 30 to continuously send the second positioning signal. When the power level of the power module 10 is greater than the predetermined power level because of receiving the solar energy to recharge, the control module 40 can again control the first positioning module 20 to send the first positioning signal.

In one embodiment, the predetermined power level can be set according to actual usage requirements, for example, the predetermined power level can be set to sixty percent of the total power of the power module 10. When the power level of the power module 10 is not less than sixty percent, the control module 40 controls the first positioning module 20 to send the first positioning signal and the second positioning module 30 to send the second positioning signal. When the power level of the power module 10 is less than sixty percent, the control module 40 controls only the second positioning module 30 to send the second positioning signal.

In one embodiment, when the power level of the power module 10 is less than the predetermined power level and the rescue-needed signal is generated in first time, the control module 40 can control the first positioning module 20 to send the first positioning signal for a predetermined duration, and then control the first positioning module 20 to enter the sleep mode after the end of the predetermined duration. The first positioning signal (GPS signal) is immediately sent when a distress occurs, improving the efficiency of searching and rescuing.

For example, when the power level of the power module 10 is less than the predetermined level and the location tracking device 100 falls into water, the rescue-needed signal is continuously generated, and the control module 40 determines whether a receiving time of the rescue-needed signal is within a predetermined period. When the receiving time of the rescue-needed signal is outside the predetermined period, the control module 40 does not send the first positioning signal via the module 20. When the receiving time of the rescue-needed signal is within the predetermined period, the control module 40 controls the first positioning module 20 to send the first positioning signal for the predetermined duration.

In one embodiment, the predetermined period can be five seconds for example. A timer of the location tracking device 100 can be reset when the location tracking device 100 is used again.

In one embodiment, when the rescue-needed signal is generated by the user pressing the help button 50 and the power level of the power module 10 is less than the predetermined power level, the control module 40 can control the first positioning module 20 to send the first positioning signal one time only in response to the help button 50 being pressed one time only.

In one embodiment, when a user carrying the location tracking device 100 is in a dangerous situation, the control module 40 can control the second positioning module 30 to send the second positioning signal according to the rescue-needed signal, and control the first positioning module 20 to send the first positioning signal for the predetermined duration. If the power of the power module 10 is less than the predetermined power, only the second positioning module 30 is continuously controlled to send the second positioning signal, and the rescuer can be assumed to be able to roughly determine location information of the user according to the first positioning signal, the rescuer can then further search for the user according to the second positioning signal which is being continuously transmitted. The GPS positioning includes position errors and power consumption problems. If the user is moving, it is difficult to accurately locate the user through GPS signals.

In one embodiment, the control module 40 can comprise one or more processors, the processor can be a central processing unit (CPU), a microprocessor, an application specific integrated circuit (ASIC), a field programmable gate array (FPGA), or a complex programmable logic device (CPLD).

Figure 3:
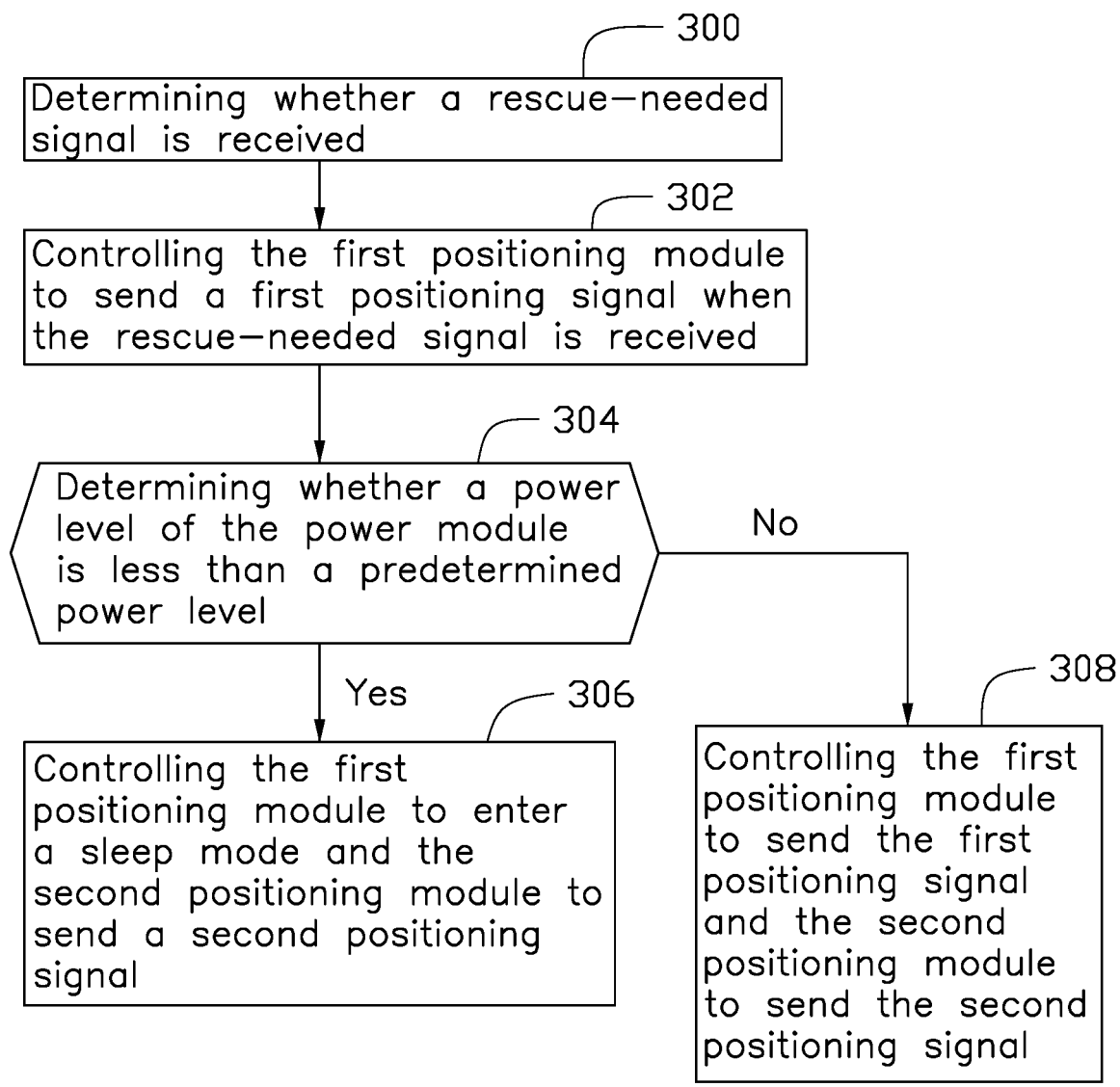
FIG. 3 is a flow diagram of an embodiment of a method for tracking location.

FIG. 3 illustrates one exemplary embodiment of a location tracking method. The flowchart presents an exemplary embodiment of the method. The exemplary method is provided by way of example, as there are a variety of ways to carry out the method. The method described below can be carried out using the configurations illustrated in FIG. 1 or FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, determining whether a rescue-needed signal is received.

In block 302, controlling the first positioning module 20 to send a first positioning signal when the rescue-needed signal is received.

In block 304, determining whether a power level of the power module 10 is less than a predetermined power level.

In block 306, controlling the first positioning module 20 to enter a sleep mode and the second positioning module 30 to send a second positioning signal when the power level of the power module 10 is less than the predetermined power level.

In block 308, controlling the first positioning module 20 to send the first positioning signal and the second positioning module 30 to send the second positioning signal when the power level of the power module 10 is not less than the predetermined power level.

In one embodiment, a power consumption of the first positioning module 20 is greater than a power consumption of the second positioning module 30.

Figure 4:
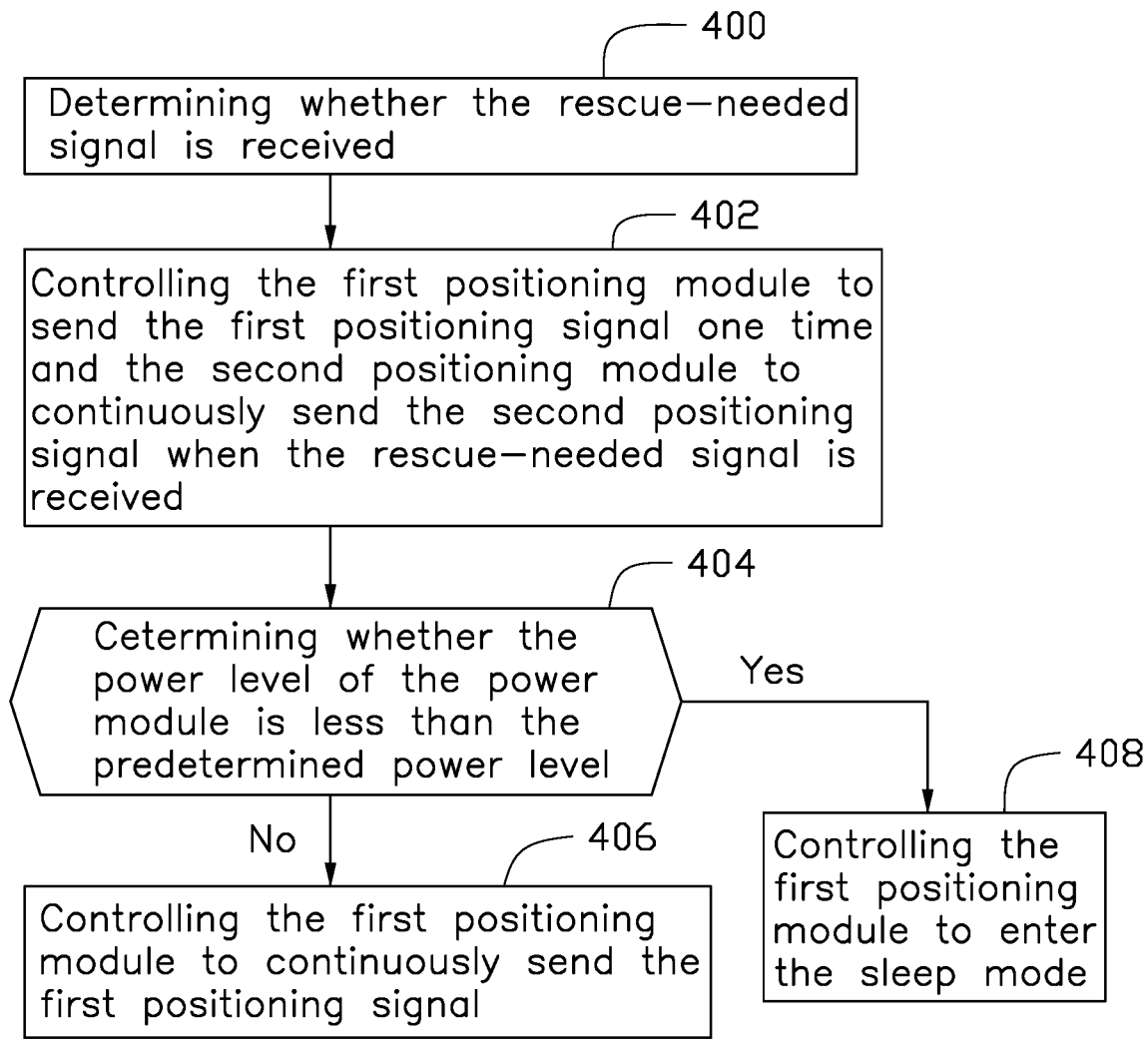
FIG. 4 is a flow diagram of another embodiment of a method for tracking location.

FIG. 4 illustrates another exemplary embodiment of the location tracking method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 400.

In block 400, determining whether the rescue-needed signal is received.

In block 402, controlling the first positioning module 20 to send the first positioning signal one time and the second positioning module 30 to continuously send the second positioning signal when the rescue-needed signal is received.

In block 404, determining whether the power level of the power module 10 is less than the predetermined power level.

In block 406, controlling the first positioning module 20 to continuously send the first positioning signal when the power level of the power module 10 is not less than the predetermined power level.

In block 408, controlling the first positioning module 20 to enter the sleep mode when the power level of the power module 10 is less than the predetermined power level.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A location tracking method operable in a location tracking device, the location tracking device comprising a power module, a control module, a first positioning module, and a second positioning module, the method comprising:
   determining, by the control module, whether a rescue-needed signal is received;
   controlling, by the control module, the first positioning module to send a first positioning signal if the rescue-needed signal is received;
   determining, by the control module, whether a power level of the power module is less than a predetermined power level; and
   controlling, by the control module, the first positioning module to enter a sleep mode and the second positioning module to send a second positioning signal if the power level of the power module is less than the predetermined power level;
   wherein a power consumption of the first positioning module is greater than a power consumption of the second positioning module, and an effective detection range of the first positioning module is greater than an effective detection range of the second positioning module.

2. The method of claim 1, further comprising:
   controlling, by the control module, the first positioning module to send the first positioning signal and the second positioning module to send the second positioning signal if the power level of the power module is not less than the predetermined power level.

3. The method of claim 1, wherein the power module is charged by solar energy.

4. The method of claim 1, wherein the first positioning module is a global position system (GPS) module, and the second positioning module is a long range (LORA) positioning module.

5. The method of claim 1, wherein the location tracking device further comprises a help button, and the method further comprises:
   generating the rescue-needed signal by pressing the help button.

6. The method of claim 1, wherein the location tracking device further comprises a detecting module, and the method further comprises:
   detecting and determining, by the detecting module, whether the current environment of the location tracking device meets a predetermined condition; and
   generating the rescue-needed signal if the current environment of the location tracking device meets the predetermined condition.

7. The method of claim 1, wherein the location tracking device further comprises a detecting module, and the method further comprises:
   detecting and determining, by the detecting module, whether physiological information of a current user of the location tracking device meets a predetermined characteristic; and
   generating the rescue-needed signal if the physiological information of the current user of the location tracking device meets the predetermined characteristic.

8. The method of claim 1, further comprising:
   controlling, by the control module, the first positioning module to send the first positioning signal for a predetermined duration before enter the sleep mode if the rescue-needed signal is received under the power level of the power module being less than the predetermined power level.

9. A location tracking device comprising:
   a power module configured to supply power to the location tracking device;
   a first positioning module coupled to the power module;
   a second positioning module coupled to the power module;
   a control module coupled to each of the power module, the first positioning module, and the second positioning module, the control module being configured to determine whether a rescue-needed signal is received, and control the first positioning module to send a first positioning signal if the rescue-needed signal is received;
   wherein a power consumption of the first positioning module is greater than a power consumption of the second positioning module, an effective detection range of the first positioning module is greater than an effective detection range of the second positioning module, and the control module is further configured to determine whether a power level of the power module is less than a predetermined power level; and if the power level of the power module is less than the predetermined power level, the control module controls the first positioning module to enter a sleep mode and the second positioning module to send a second positioning signal.

10. The device of claim 9, wherein if the power level of the power module is not less than the predetermined power level, the control module controls the first positioning module to send the first positioning signal and the second positioning module to send the second positioning signal.

11. The device of claim 9, wherein the power module is charged by solar energy.

12. The device of claim 9, wherein the first positioning module is a GPS module, and the second positioning module is a LORA positioning module.

13. The device of claim 9, wherein the location tracking device further comprises a help button; and the help button is coupled to the control module, when the help button is pressed, the rescue-needed signal is generated.

14. The device of claim 9, wherein the location tracking device further comprises a detecting module; the detecting module is coupled to the control module, the detecting module is configured to detect and determine whether the current environment of the location tracking device meets a predetermined condition; and if the current environment of the location tracking device meets the predetermined condition, the rescue-needed signal is generated.

15. The device of claim 9, wherein the location tracking device further comprises a detecting module; the detecting module is coupled to the control module, the detecting module is configured to detect and determine whether physiological information of a current user of the location tracking device meets a predetermined characteristic; and if the physiological information of the current user of the location tracking device meets the predetermined characteristic, the rescue-needed signal is generated.

16. The device of claim 9, wherein if the rescue-needed signal is received under the power level of the power module being less than the predetermined power level, the control module controls the first positioning module to send the first positioning signal for a predetermined duration before enter the sleep mode.

* * * * *